United States Patent Office 3,106,202
Patented Oct. 8, 1963

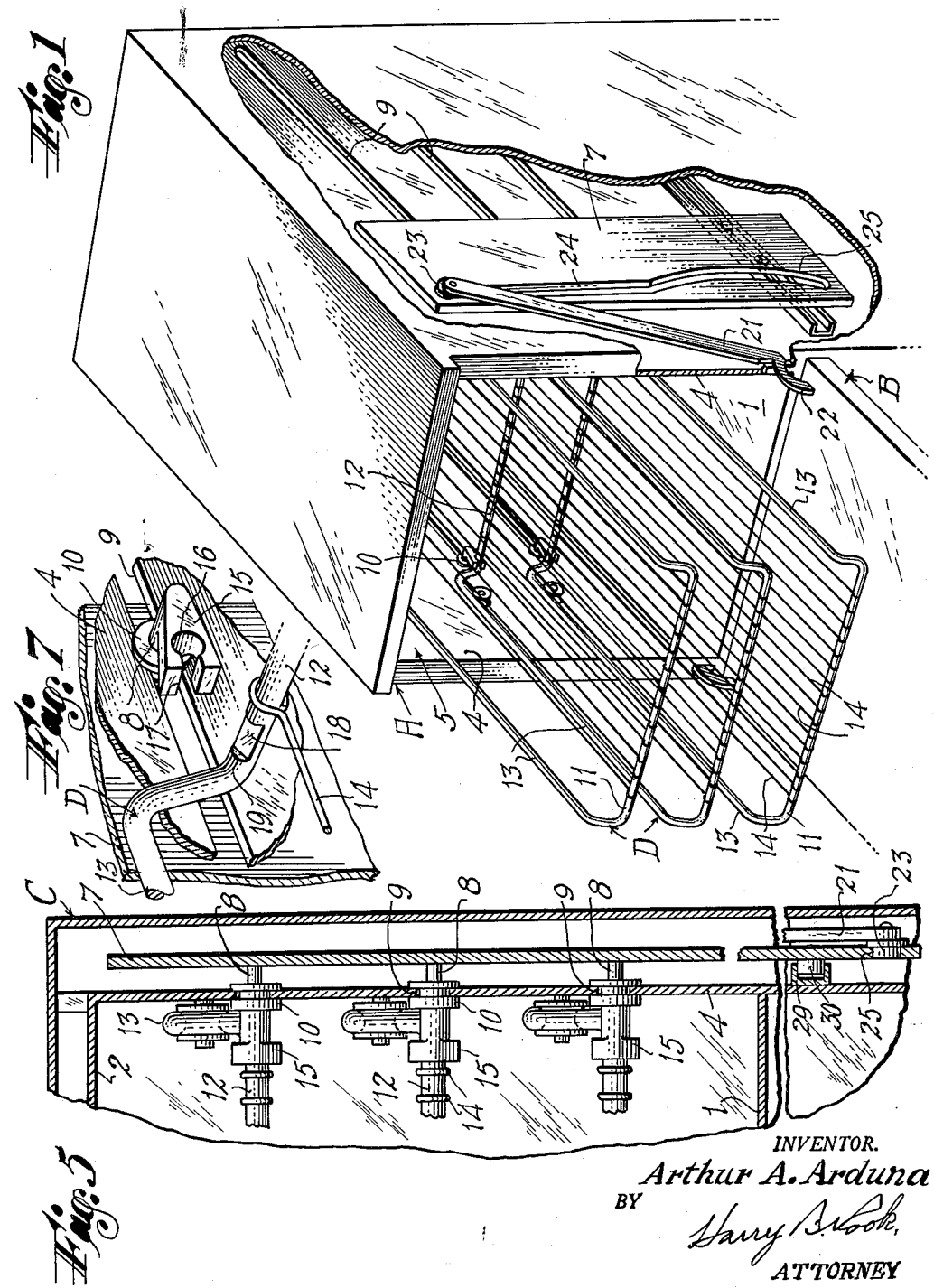

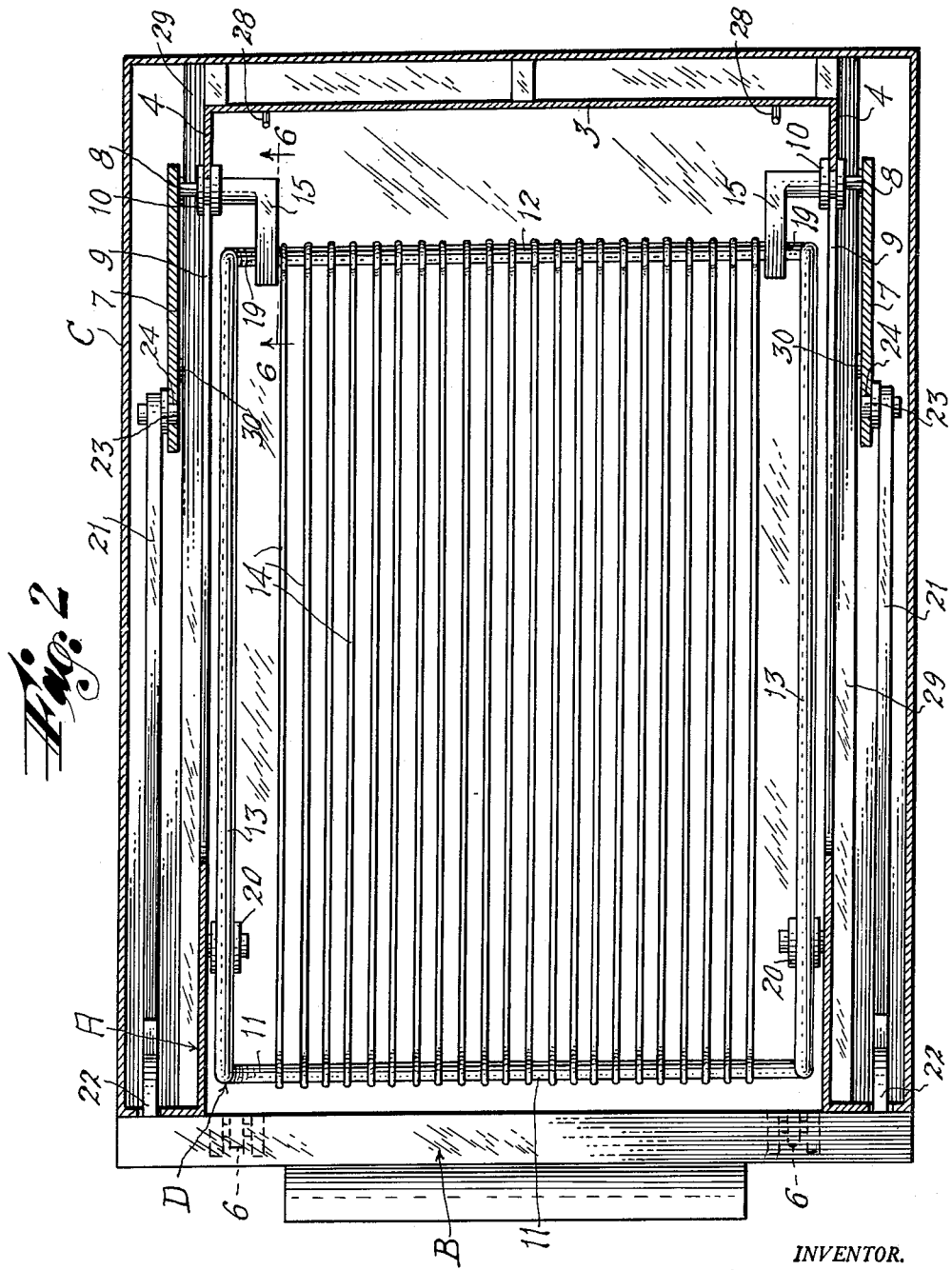

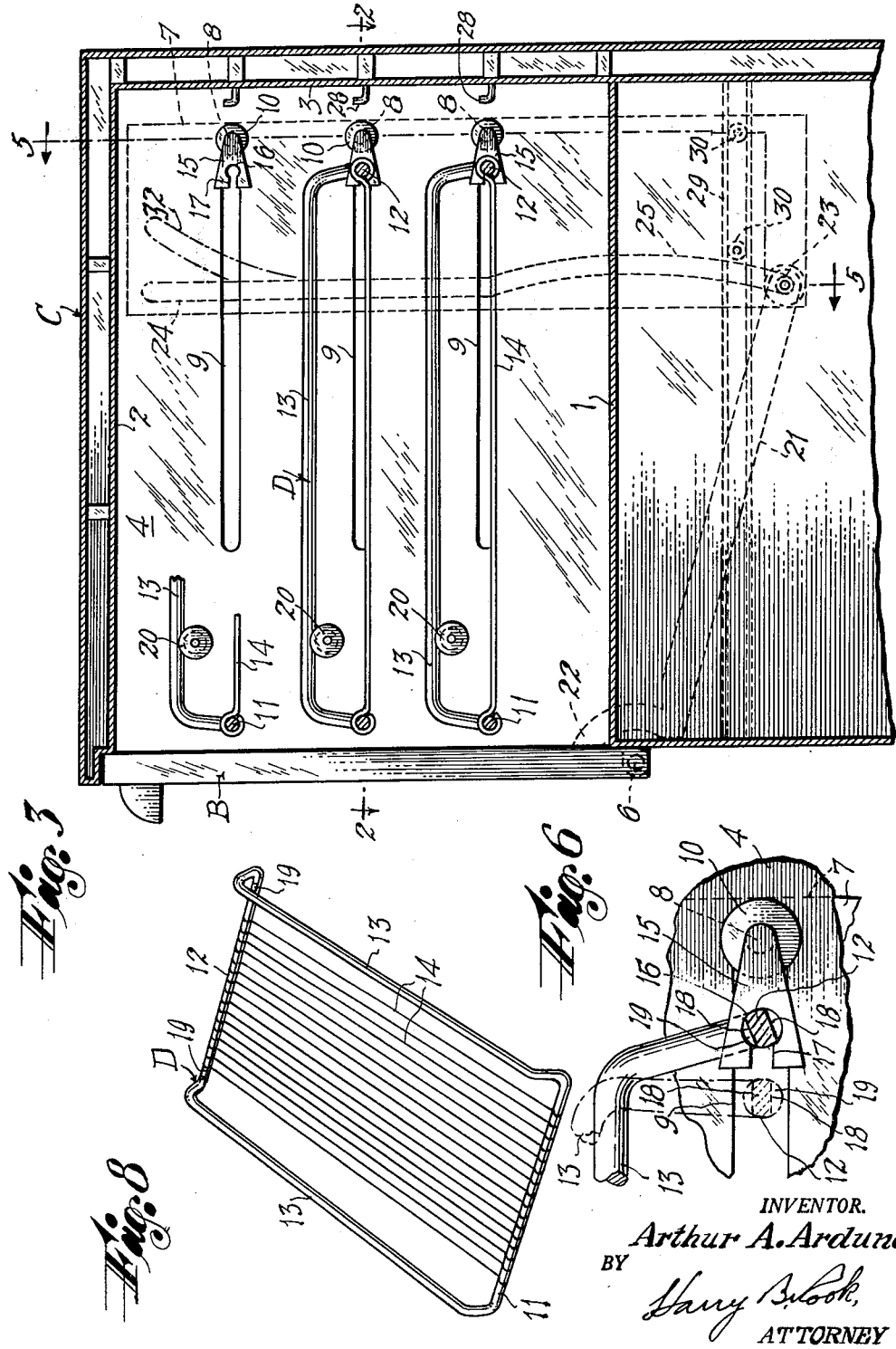

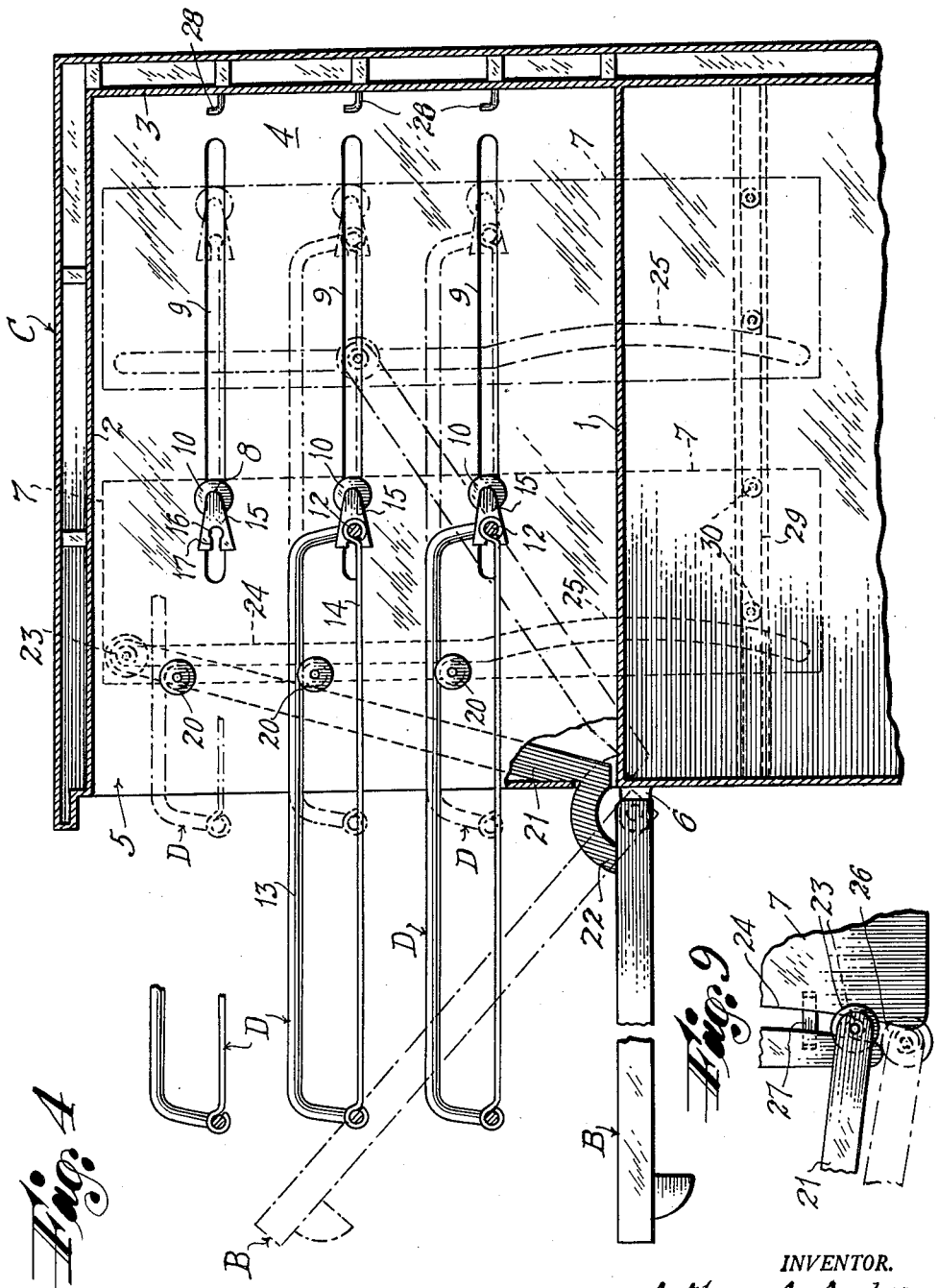

3,106,202
OVEN WITH RACK OPERATING MECHANISM
Arthur A. Arduna, North Arlington, N.J.
(583–B Benedict Road, West Point, N.Y.)
Filed Jan. 16, 1959, Ser. No. 787,232
4 Claims. (Cl. 126—340)

This invention relates in general to cooking ovens, and a principal object of the invention is to provide a novel and improved construction and combination of a cooking oven and mechanism for automatically projecting the racks or trays partially out of the oven on opening of the oven door and returning the racks or trays into the oven on closure of the oven door.

Another object of the invention is to provide such a combination which shall embody a novel and improved construction whereby the oven door may be partially opened without moving the trays or racks so as to permit inspection of articles on the racks being cooked in the oven without moving the racks from the oven, and the trays or racks will be automatically projected from the oven for easy removal from or placement in the oven upon full opening of the door.

A further object is to provide in such a combination, novel and improved coupling means for separably connecting the trays or racks to said mechanism for moving the racks into and out of the oven, whereby the rack can be easily and quickly removed from and replaced in the oven for cleaning, or one or more racks can be removed when it is desired to cook exceptionally large articles, for example, a turkey.

Still another object is to provide novel and improved means for selectively mounting the racks or trays either fixedly in the oven or for automatic movement out of and into the oven upon opening and closing of the door, respectively.

It is another object of the invention to provide a novel and improved, simple, inexpensive, and reliable construction and combination of the oven door with means for actuating the trays into and out of the oven.

Other objects, advantages, and results of the invention will be brought out by the following description, in conjunction with the accompanying drawings, in which:

FIGURE 1 is a horizontal perspective view of a combined oven and mechanism for automatically moving the article-supporting racks or trays into and out of the oven, illustrating the oven door in full open position and the racks in their outermost projected positions, and with portions of the side wall of the oven broken away for clearness of illustration;

FIGURE 2 is a horizontal sectional view taken approximately on the plane of the line 2—2 of FIGURE 3;

FIGURE 3 is a central vertical longitudinal sectional view through the oven with the racks in their innermost positions, with the oven door closed and with a portion of one of the racks broken away;

FIGURE 4 is a similar view showing the racks at their outermost projected positions with the oven door fully open, in solid lines, and with the racks in partially projected position and the door partially open, in dot and dash lines;

FIGURE 5 is an enlarged fragmentary vertical sectional view approximately on the plane of the line 5—5 of FIGURE 3;

FIGURE 6 is a fragmentary enlarged sectional view approximately on the plane of the line 6—6 of FIGURE 2 but showing the manner of connecting one of the racks or trays to the actuating mechanism therefor;

FIGURE 7 is a composite fragmentary perspective view of a portion of one end of one of the racks and one of the coupling elements for separably connecting the rack to the actuating means;

FIGURE 8 is a detached perspective view, on a reduced scale, of one of the trays or racks; and FIGURE 9 is a fragmentary elevational view of a portion of one of the actuating plates and a portion of the arm for actuating the plate, showing a modification of the plate.

Specifically describing the illustrated embodiment of the invention, the reference character A generally designates a cooking oven of known construction that includes a bottom wall 1, a top wall 2, a rear wall 3, two side walls 4, and a front opening 5 that is normally closed by a door B which is hingedly mounted at its lower edge by suitable hinges 6 so as to swing vertically into positions to close and to open said opening 5 as shown in FIGURES 3 and 4, respectively. As usual, the oven itself is enclosed within a casing C with at least an air space or other heat insulation between the walls of the oven and the casing.

As usual, there are a plurality of article-supporting racks or trays D for supporting articles to be cooked within the oven, and in accordance with the invention, novel and improved mechanism is provided for horizontally moving the racks rearwardly into and forwardly out of the oven upon closing and opening movements of the door B, respectively. As shown, said mechanism includes two actuating plates 7, one mounted on each of the side walls 4 of the oven at the outer sides of said walls, each actuating plate having a plurality of guide-support studs 8 rigidly connected thereto and with each stud projecting through a horizontal slot 9 in the corresponding side wall. Preferably, but not necessarily, a double-flanged roller 10 is mounted on each stud 8 within the corresponding slot 9 as best shown in FIGURES 2 and 5.

The studs 8 also serve as parts of coupling elements for separably connecting the racks D to the actuating plates and for mounting the trays for horizontal sliding movement in the oven. The trays may be of any suitable construction, but as shown, each tray has a front cross rod 11 and a rear cylindrical cross rod 12 that are connected by longitudinal side rods 13, and article-supporting wires 14 are mounted on the cross rods 11 and 12. The rear cross rod coacts with the coupling elements that include the studs 8 and heads 15 rigidly secured to the studs and projecting into the oven as best shown in FIGURES 2 and 5. Each head 15 has an opening 16 of a diameter slightly greater than the diameter of the cross rod 12 and with its axis extending transversely of the oven. Each opening has a restricted mouth slot 17 that extends from the opening through the forward face of the head as best shown in FIGURES 4 and 7, the width of said slot being slightly greater than the distance between two flat surfaces 18 of cutaway portions 19 on the cross rod 12 so that when the rack is tilted upwardly and moved rearwardly the cutaway portions of the cross rod will slip through the mouth slot 17 as shown by dot and dash lines in FIGURES 6, and upon downward swinging of the rack, the cutaway portion will lie transversely of the mouth slot and lock the cross rod against removal from the openings 16 of the heads 15 of the corresponding coupling elements, as shown by solid lines in FIGURE 6.

Cooperating with the coupling elements in supporting the racks, is a support element 20 shown in the form of a roller, secured to the inner side of each oven side wall for each rack and underlying one of the side rods of the corresponding rack, said support elements 20 being mounted forwardly of the connections between the racks and the coupling elements to support the outer end portions of the racks.

The racks are moved horizontally into the oven and out of the oven opening 5 by means directly connecting the door B and both of the actuating plates 7. As shown, an arm 21 for each actuating plate 7 is rigidly connected to the door B adjacent the axis of the hinges 6 as indicated at 22 and extends rearwardly and outside the corresponding actuating plate as best shown in FIGURES 1, 4, and 5, and each arm has a lateral projection 23, preferably in the form of a roller, that extends through a vertical slot 24 in the corresponding actuating plate, the parts being so proportioned and related that when the door is closed, the plates are in their rearmost positions as shown by dotted lines in FIGURE 3 with the arms 21 extending downwardly, and as the door is opened, the projections 23 move upwardly in the slots 24 so as to pull the actuating plates forwardly as shown by dotted lines in FIGURE 4, the arms 21 moving from their downwardly inclined positions of FIGURE 3 to their upwardly inclined positions of FIGURE 4.

In order to permit the oven to be partially opened for inspection of the articles herein without moving the racks out of the oven, the lower portions of the slots are curved as indicated at 25, preferably arcuately and concentric with the axes of the hinges 6. This construction permits the projections 23 on the arms 21 to move idly through the curved portions 25 of the slots without moving the actuating plates. The door is shown in partially open position by dot and dash lines and the racks are shown in their correspondingly partial projected positions by dot and dash lines in FIGURE 4.

To facilitate the insertion of the projection 23 into the slot 24 of the actuating plate, particularly when the invention is used in conjunction with ovens having removable doors, the lower ends of the slots may be left open as indicated at 26 in FIGURE 9, wherein the projection shown in dot and dash lines is being shown as inserted into the slot. To prevent distortion of the plate at opposite sides of the open end of each slot, a reinforcing bridge piece 27 may be connected to the plate at opposite sides of the slot.

In some cases it may be desirable to detach the racks from the actuating mechanism and stationarily support the racks in the oven. For this purpose, hooks 28 for each of the racks may be secured to the rear wall of the oven to receive and support the rear cross rod of the corresponding rack and with the forward portion of the rack still supported by the corresponding support elements 20. It will be readily understood that the racks can easily be removed from the oven by simply tilting them to disconnect the rear cross rods from the coupling elements or the hooks 28 and then pulling the racks forwardly so that the rear end portions of the side rods 13 roll or slide off the support elements 20.

While the invention has been shown as embodied in certain structural details and in conjunction with a known type of cooking oven, it will be understood that this is primarily for the purpose of illustrating the principles of the invention, and the invention may be embodied in other rack moving mechanisms for other structures, all within the spirit and scope of the invention. Also, the structural details of the mechanism may be modified and changed, and support guides may be provided for the actuating plates 7; for example, guide channels 29 are shown on the side walls 4 of the oven in which run rollers 30 that are journaled on the corresponding plates 7. Furthermore, the form of the slots 24 can be changed to vary the extent of projection of the racks, for example, the upper ends of the slots can be curved as indicated by dot and dash lines 32 in FIGURE 3.

What I claim is:

1. The combination of an oven having top, bottom, rear and side walls and a front opening, a door having a hinge at its lower edge for vertical swinging movement to positions to close and to open said opening, a plurality of racks, an actuating plate disposed at the outer side of each of said side walls for forward and rearward movements, means mounting said racks on said side walls and separably connecting the rear end portions of said racks to said actuating plates for horizontal movement of the racks rearwardly into and forwardly out of said oven upon rearward and forward movements of said actuating plates respectively, and means directly connecting said door and both of said plates which provides for forward and rearward movements of said plates upon opening and closing movements of said door, respectively, and including arms rigidly connected to said door adjacent said hinge, one arm extending rearwardly outside each side wall of the oven and having a lateral projection slidable in a slot vertically disposed in the corresponding actuating plate, said arms extending downwardly from said hinge and said actuating plates being at their rearmost positions when the door is closed and the lower portions of said slots in the actuating plates being curved arcuately concentrically with the axis of the hinge providing for movement of said door into partially open position without movement of said plates and said racks.

2. The combination of an oven having top, bottom, rear, and side walls and a front opening, a door having a hinge at its lower edge for vertical swinging movement to positions to close and to open said opening, a plurality of racks, an actuating plate disposed at the outer side of each of said side walls for forward and rearward movements, means mounting said racks on said side walls and separably connecting the rear end portions of said racks to said actuating plates for horizontal movement of the racks rearwardly into and forwardly out of said oven upon rearward and forward movements of said actuating plates respectively, and means directly connecting said door and both of said plates which provides for forward and rearward movements of said plates upon opening and closing movements of said door, respectively, and including arms rigidly connected said door adjacent said hinge, one arm extending rearwardly outside each side wall of the oven and having a lateral projection slidable in a slot vertically disposed in the corresponding actuating plate, each side wall having at least one horizontal slot and each actuating plate having at least one guide-support stud rigidly connected thereto and slidably engaging the walls of one of said slots.

3. The combination of an oven having top, bottom, rear, and side walls and a front opening, a door having a hinge at its lower edge for vertical swinging movement to positions to close and to open said opening, a plurality of racks, an actuating plate disposed at the outer side of each of said side walls for forward and rearward movements, means mounting said racks on said side walls and separably connecting the rear end portions of said racks to said actuating plates for horizontal movement of the racks rearwardly into and forwardly out of said oven upon rearward and forward movements of said actuating plates respectively, and means directly connecting said door and both of said plates which provides for forward and rearward movements of said plates upon opening and closing movements of said door, respectively, and including arms rigidly connected to said door adjacent said hinge, one arm extending rearwardly outside each side wall of the oven and having a lateral projection slidable in a slot vertically disposed in the corresponding actuating plate, each side wall having at least one horizontal slot and each actuating plate having at least one guide-support stud rigidly connected thereto and slidably engaging the walls of one of said slots, and there being separably coacting coupling elements on said studs and said racks for separably connecting the rear end portions of said racks to said actuating plates.

4 A combination as set forth in claim 3 wherein each rack includes a rear cross-rod on which, are the said coupling elements that are carried by the rack, horizontal side rods connected to said rear cross-rod, and a pair of support elements for each rack, one on the inside of each side wall of the oven on which one of said side rods of the rack is slidable as the rack is moved into and out of the oven by said actuating plates.

References Cited in the file of this patent

UNITED STATES PATENTS

| | | |
|---|---|---|
| 201,736 | Blakesley | Mar. 26, 1878 |
| 299,672 | Newell | June 3, 1884 |
| 1,507,778 | Keavey et al. | Sept. 9, 1924 |
| 1,684,595 | Parke | Sept. 18, 1928 |
| 1,894,268 | Forsyth et al. | Jan. 17, 1933 |
| 1,946,532 | Hatch | Feb. 13, 1934 |
| 1,953,688 | Otte | Apr. 3, 1934 |
| 2,069,706 | Gerwig et al. | Feb. 2, 1937 |
| 2,070,049 | Hillman | Feb. 9, 1937 |
| 2,296,950 | Roedl | Sept. 29, 1942 |
| 2,319,651 | Wilkinson et al. | May 18, 1943 |
| 2,361,525 | Ball et al. | Oct. 31, 1944 |
| 2,520,816 | Sherman | Aug. 29, 1950 |
| 2,576,252 | Conner | Nov. 27, 1951 |

FOREIGN PATENTS

| | | |
|---|---|---|
| 756,995 | France | Oct. 2, 1933 |